March 1, 1960 H. O. KOPLIN ET AL 2,926,948
FOLDING SEAT STRUCTURE FOR A VEHICLE BODY
Filed Oct. 16, 1957 7 Sheets-Sheet 1

INVENTORS
Hans O. Koplin,
John O. C. Pietsch,
Harry W. Roach &
BY Ted Stewart
W. J. Pettigrew
ATTORNEY March 1, 1960 H. O. KOPLIN ET AL 2,926,948
FOLDING SEAT STRUCTURE FOR A VEHICLE BODY
Filed Oct. 16, 1957 7 Sheets-Sheet 2

INVENTORS
Hans O. Koplin,
John O.C. Pietsch,
Harry W. Roach &
BY Ted Stewart

ATTORNEY

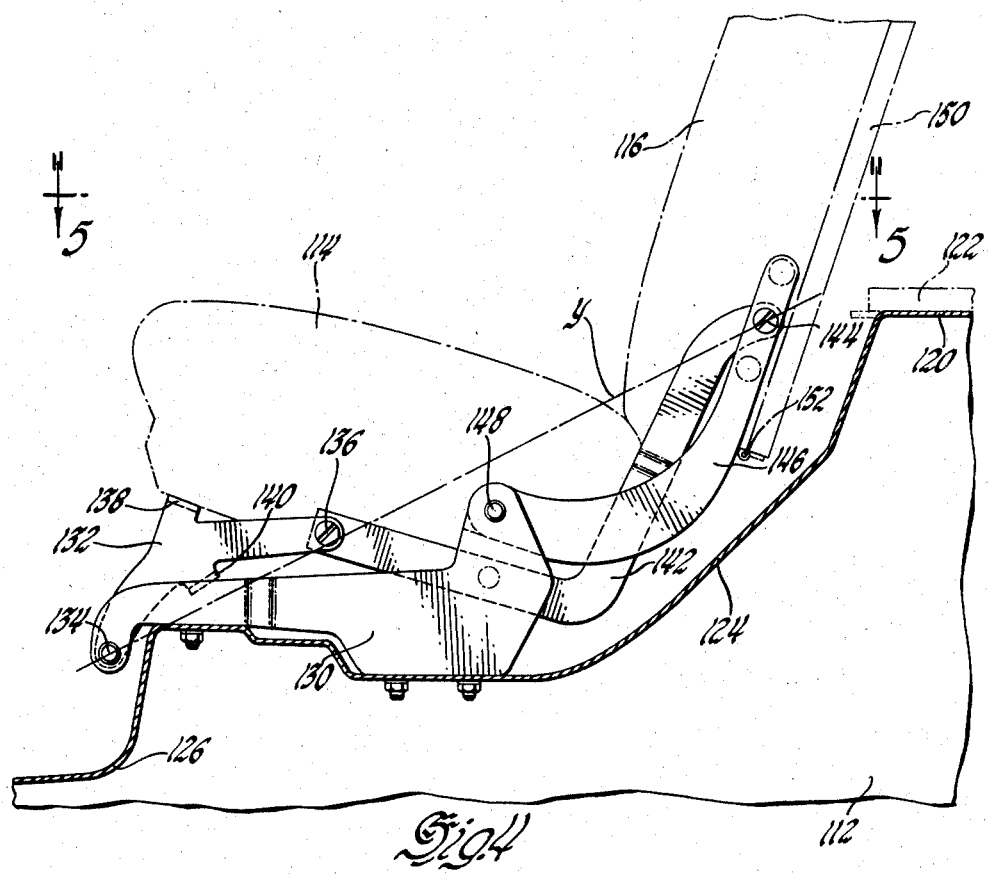
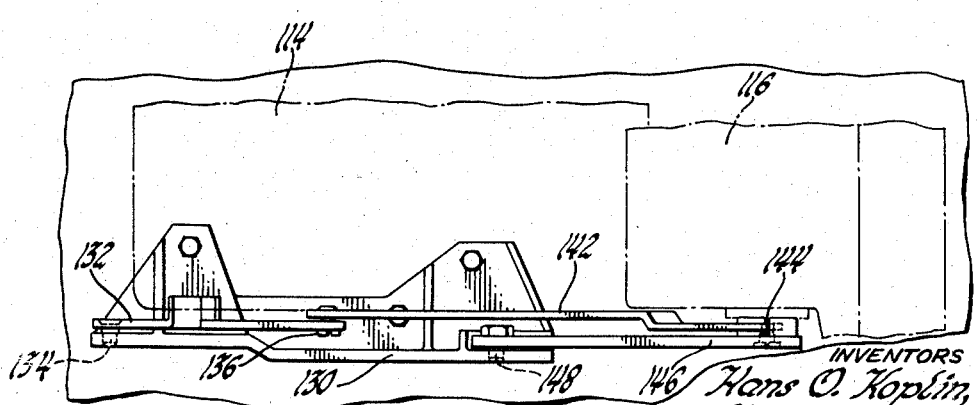

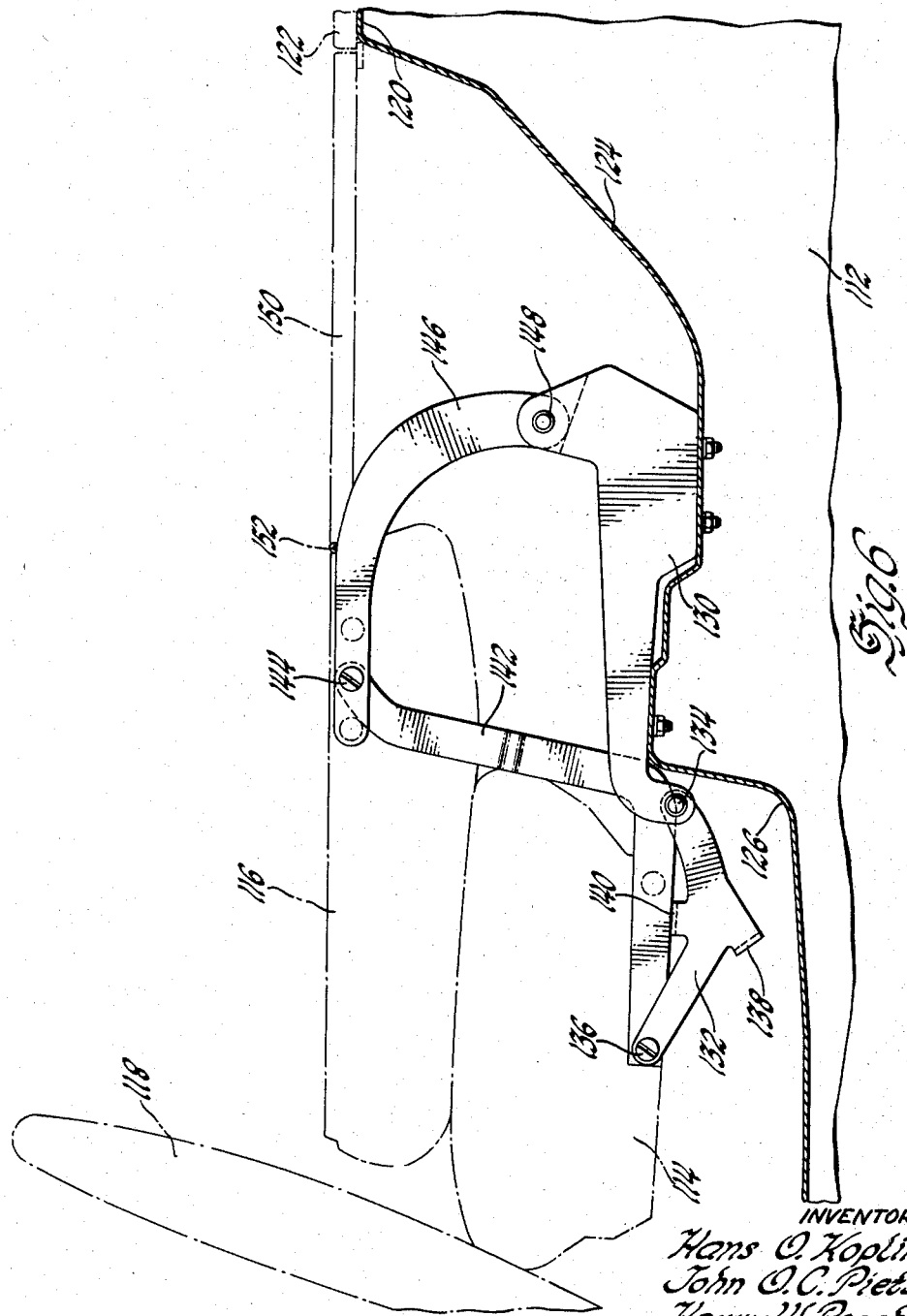

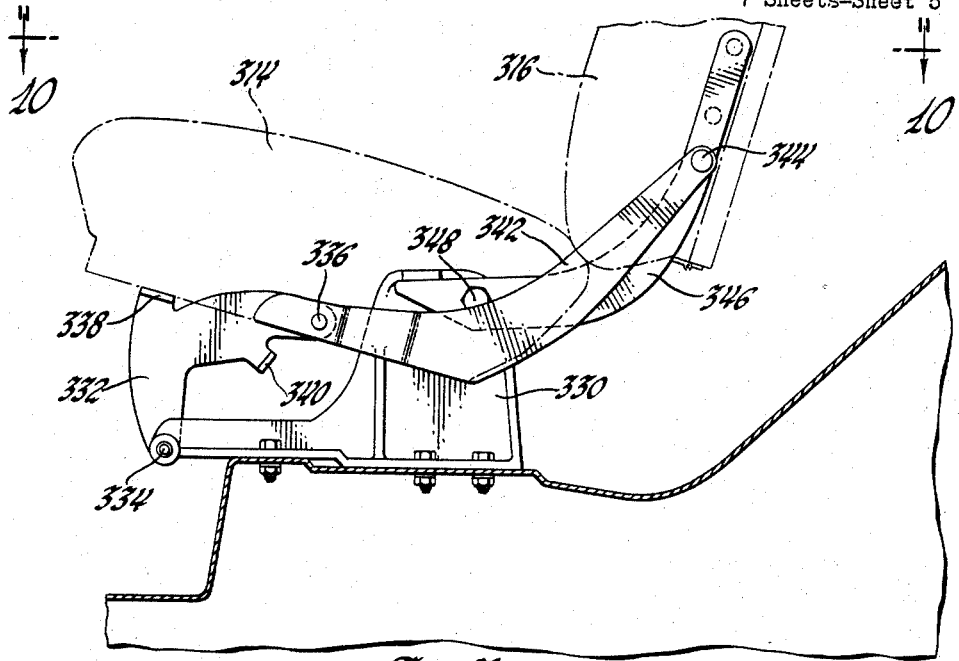
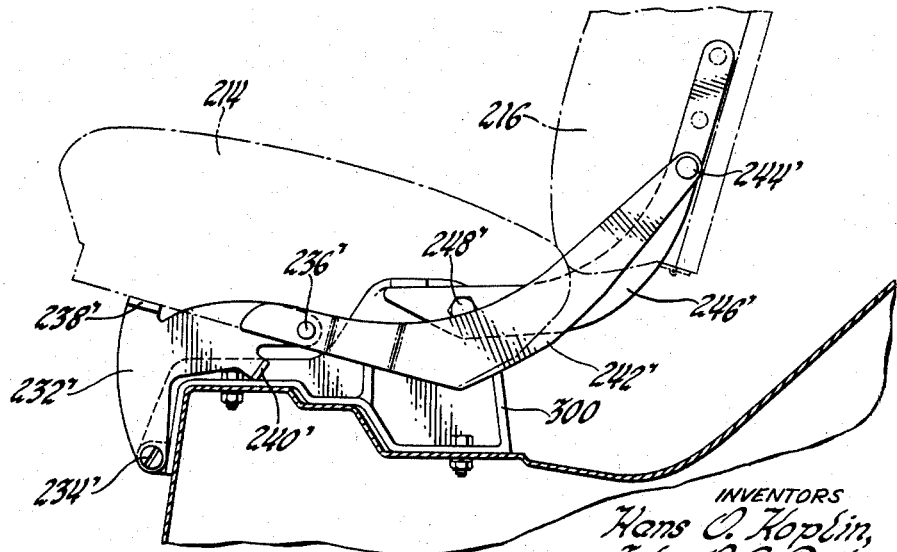

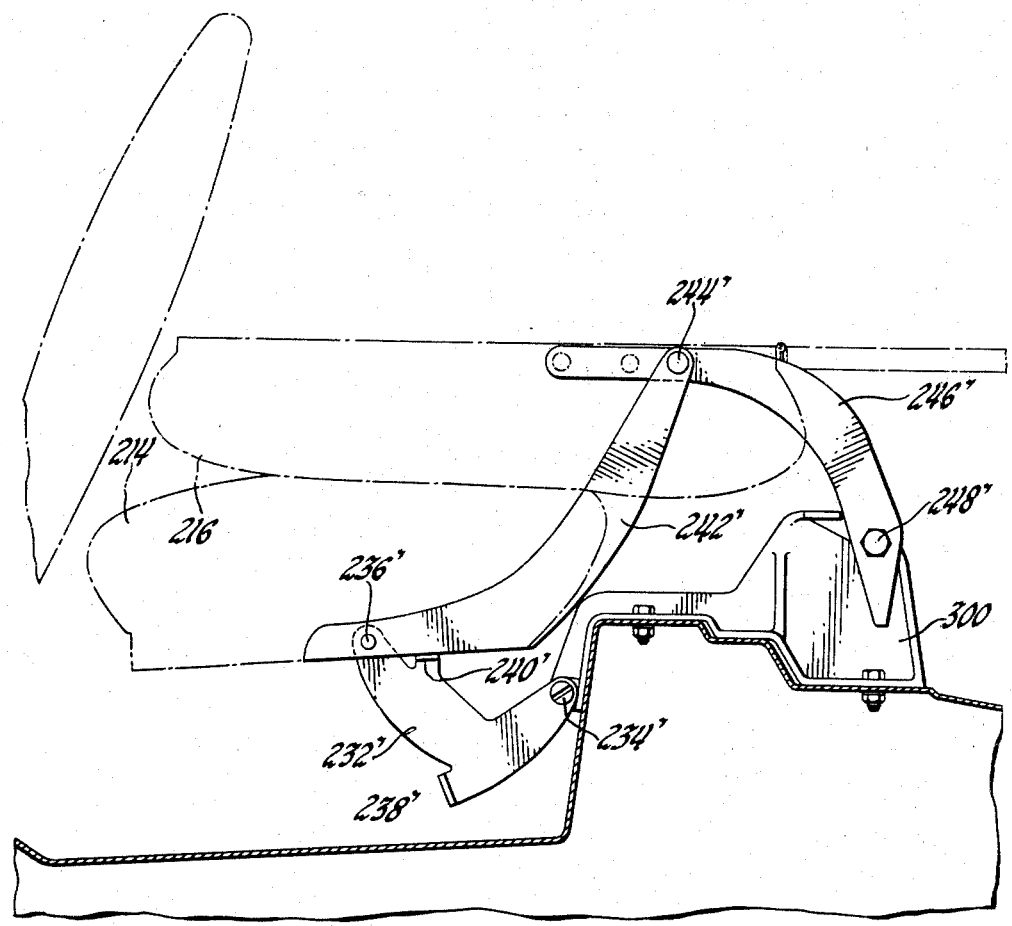

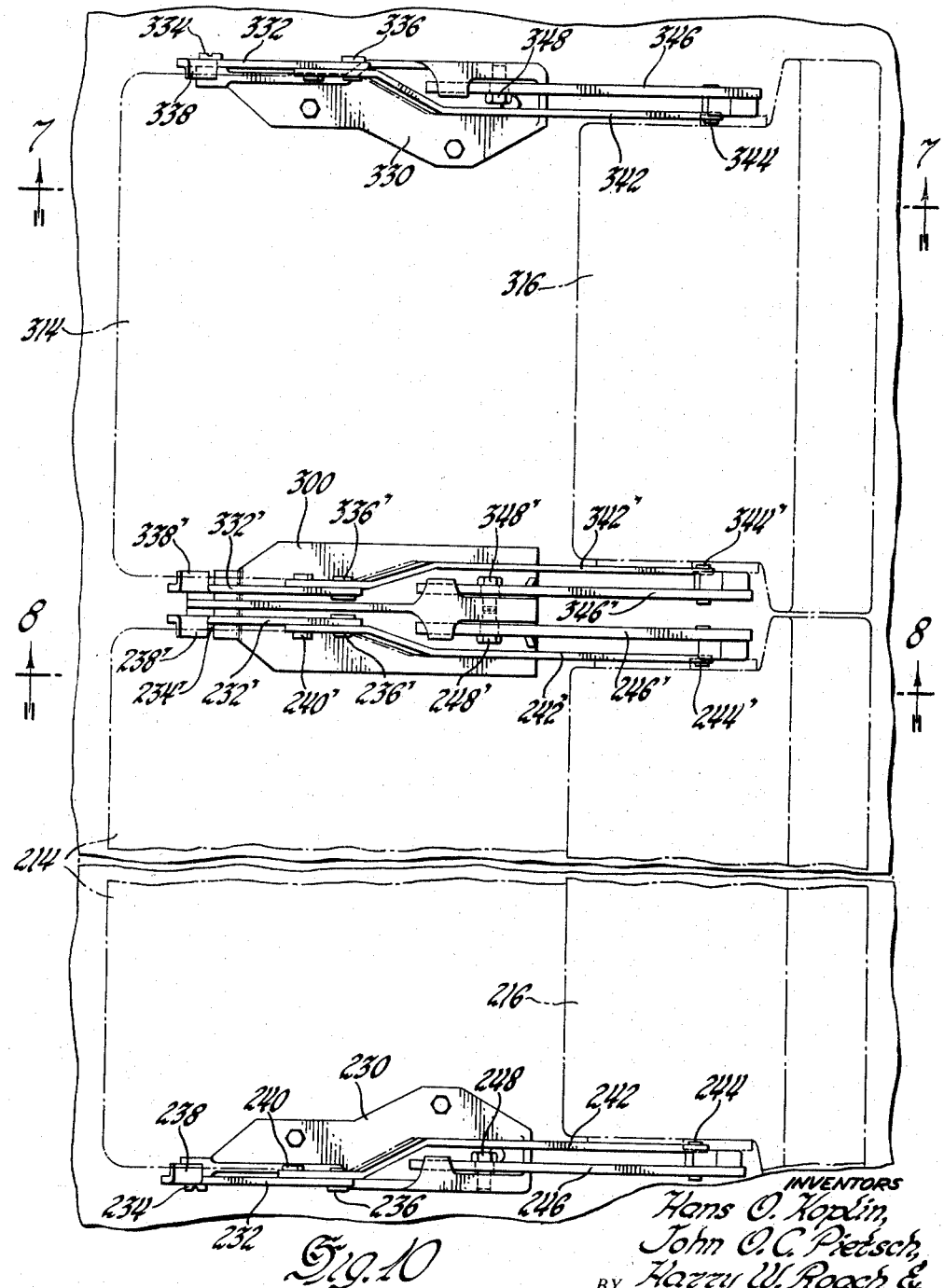

United States Patent Office

2,926,948
Patented Mar. 1, 1960

2,926,948

FOLDING SEAT STRUCTURE FOR A VEHICLE BODY

Hans O. Koplin, Center Line, John O. C. Pietsch, Birmingham, Harry W. Roach, Farmington, and Ted Stewart, Royal Oak, Mich., assignors to General Motors Corporation, Detroit, Mich., a corporation of Delaware Application October 16, 1957, Serial No. 690,569

5 Claims. (Cl. 296—66)

This invention relates to a folding seat structure for a vehicle body, and more particularly to a folding seat for a station wagon wherein the seat may be folded down to extend the cargo support floor.

One feature of the invention is that it provides an improved folding seat structure for a vehicle body; another feature of the invention is that it provides an improved folding seat for a station wagon wherein the seat may be folded down to extend the cargo support floor; a further feature of the invention is that the seat cushion and seat back are interconnected by link means whereby the seat back may be swung forwardly and downwardly to a prone position wherein its back side forms a support floor; still another feature of the invention is that there is a sheet member hingedly mounted on the seat back and swingable rearwardly when the seat back is in its prone position into the plane of said support floor; yet a further feature of the invention is that in its preferred form, the pivotal connections of the linkage means are so arranged that the seat back cannot be pushed straight forward as might happen in the event a load shifted in the rear part of the vehicle, but the front edge of the seat cushion must be lifted slightly as it is swung forwardly to its prone position; and still another feature of the invention is that in another form the pivotal connections of the link means are so arranged that a straight, forward push may be utilized to swing the seat back forwardly to its prone position.

Other features and advantages of the invention will be apparent from the following description and from the drawings, in which:

Fig. 4 is a section similar to Fig. 1 but showing a modified form of the invention;

Fig. 5 is a section taken along the line 5—5 of Fig. 4, showing the linkage means in top plan;

Fig. 6 is a section similar to Fig. 4 but showing the parts in a different position;

Fig. 7 is a fragmentary longitudinal section through a portion of a station wagon body, taken along the line 7—7 of Fig. 10, showing another form of the invention wherein it is applied to the single passenger side of a split seat in a station wagon;

Fig. 8 is a section taken along the line 8—8 of Fig. 10;

Fig. 9 is a view similar to Fig. 8 but showing the parts in a different position; and Fig. 10 is a section taken along the line 10—10 of Fig. 7 and showing the linkage in top plan.

Figure 1:
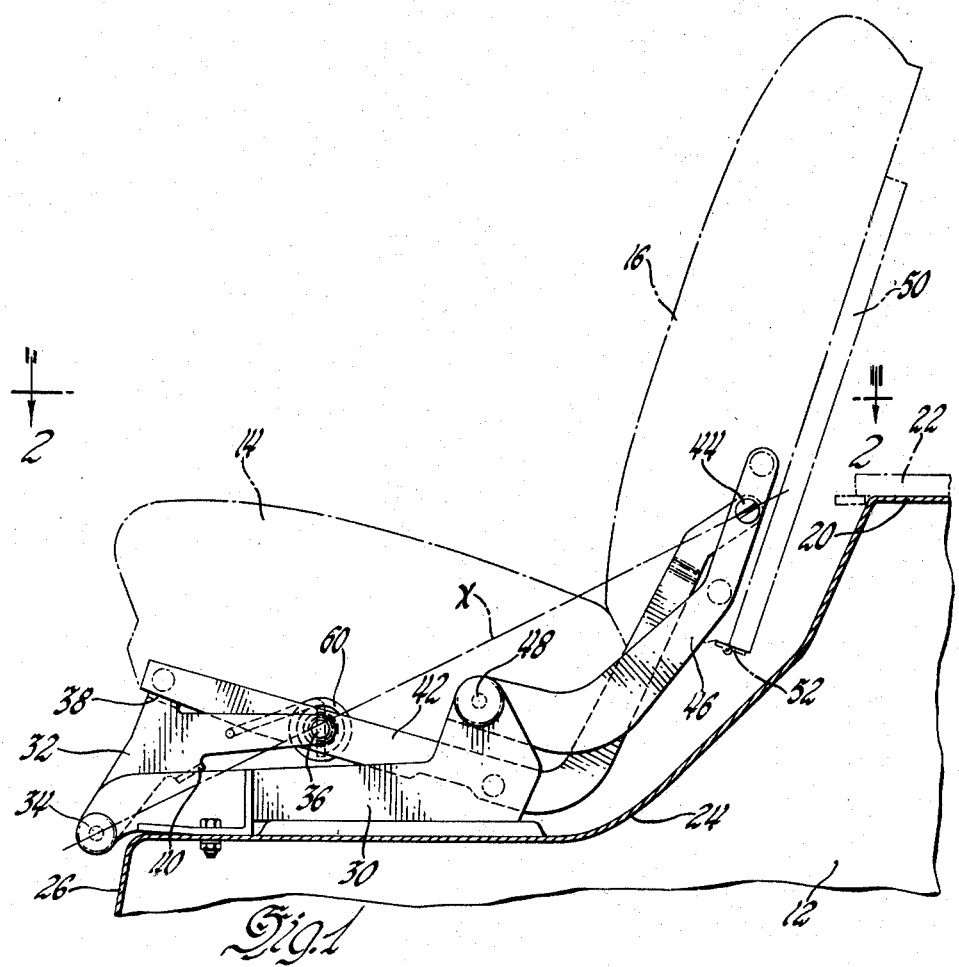
Fig. 1 is a fragmentary longitudinal section through a portion of a station wagon body showing the improved folding seat structure in side elevation.
Figure 2:
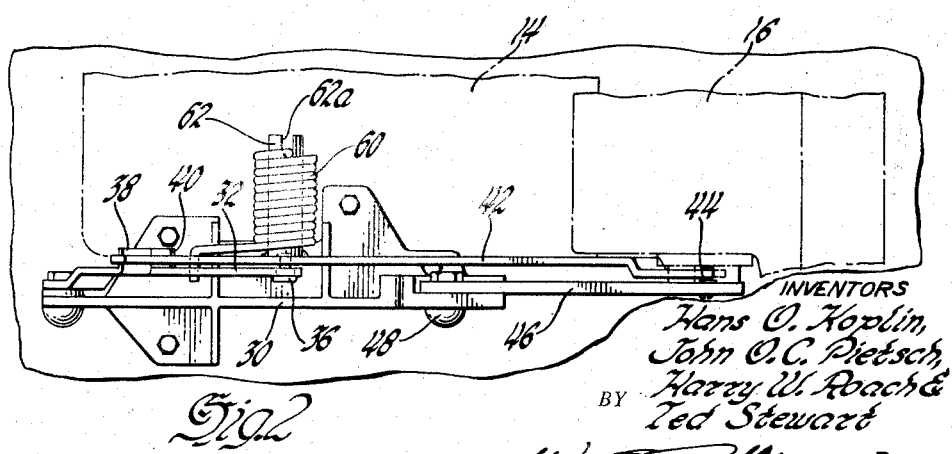
Fig. 2 is a section taken along the line 2—2 of Fig. 1 showing the linkage structure in top plan.

In a station wagon the second seat which is immediately behind the front seat, i.e., the rear seat in a six passenger station wagon and the middle seat in a nine passenger station wagon, conventionally is arranged so that it may be swung down to extend the cargo support floor. When this seat is used to carry passengers, the seat is arranged as shown in Figs. 1 and 2. When it is desired to extend the cargo support floor of the station wagon, the second seat is folded down so that a portion of the seat structure lies in the plane of and forms an extension of the cargo support floor.

In the past, several arrangements have been used for converting the station wagon from a passenger carrying vehicle to a cargo carrying vehicle. In some instances, the cushion of the second seat was swung forwardly through an arc of 90 degrees so that it stood on end behind the seat back of the driver's seat, and the seat back of the second seat was swung downwardly and forwardly through an arc of substantially 90 degrees to a prone position so that its back surface formed an extension of the cargo support floor. In an improved arrangement, the second seat cushion was swung forwardly through an arc of substantially 180 degrees so that its bottom surface formed the front portion of the extended cargo support floor and the back of the second seat was swung forwardly through an arc of substantially 90 degrees so that its rear surface formed the intermediate portion of the extended cargo support floor. In both of these arrangements, the seat cushion and the seat back were independently movable, that is, first it was necessary to swing the seat cushion to its cargo carrying position and then it was necessary to swing the seat back to its cargo carrying position.

Proposals have been made to interconnect the seat cushion and seat back so that the movement of these two seat elements was coordinated, but such arrangements which were devised in the past have been considered too cumbersome and costly to find wide commercial acceptance.

We have invented an improved folding seat structure for a vehicle body in which the seat back and seat cushion are interconnected by link means so that the seat back may be swung forwardly and downwardly to a prone position wherein its back side forms the front portion of the extended support floor, and during this swinging movement of the seat back, the link means carries the seat cushion forwardly and downwardly beneath the seat back. According to the invention, a sheet member hingedly mounted on the seat back is swingable rearwardly into the plane of the support floor when the seat back is in its prone position to form the intermediate portion of the extended support floor. In one form of the invention, the link means are so arranged that a straight, forward force may be used to swing the seat back to its prone position. In another form of the invention, the link means are so arranged that a straight, forward force serves to lock the seat back tighter in its upright position so that the seat back will not be swung down if a load in the vehicle shifts forwardly against its rear surface. After the front edge of the seat cushion has been lifted slightly, the seat back may be swung forwardly to its prone position, and during this movement, the link means carry the seat cushion forwardly and downwardly beneath the seat back.

Figure 3:
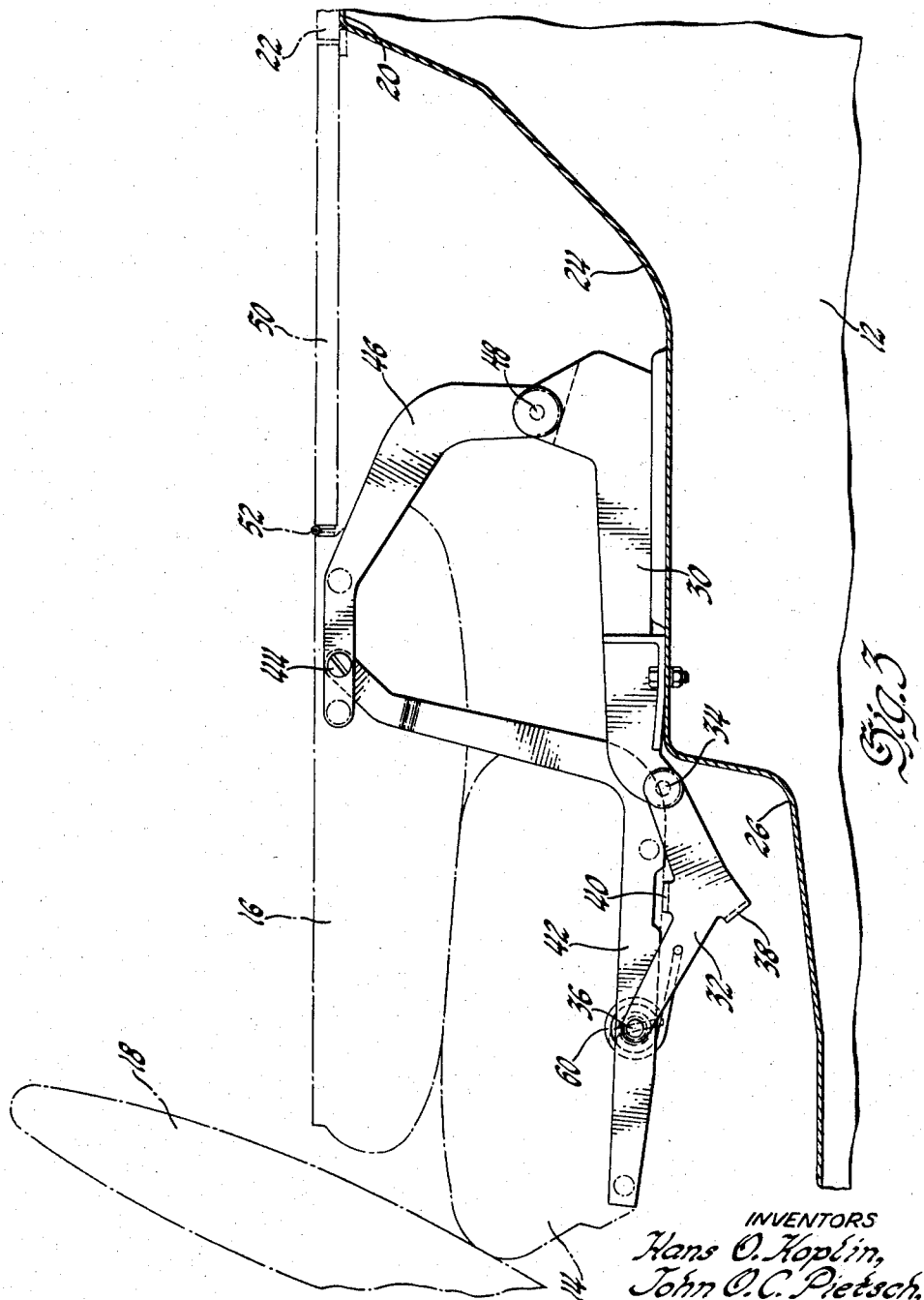
Fig. 3 is a section similar to Fig. 1 but showing the parts in a different position.

Referring now more particularly to Figs. 1, 2 and 3 of the drawings in which the preferred embodiment of the invention is illustrated, a portion of a station wagon body is shown at 12 and the second seat cushion in the station wagon is designated at 14 while the seat back is designated at 16. In Fig. 3, 18 illustrates a portion of the seat back of the front or driver's seat. The floor portion of the station wagon body includes a rear part 20 which forms the permanent cargo support floor and which preferably is covered with a mat 22. The floor sweeps downwardly and forwardly in a portion identified as 24 to provide a mounting portion for the second seat and forwardly of the second seat there is another downwardly and forwardly swept portion 26 which provides foot space for passengers seated in the second seat. Bolted to the floor portion 24 is a seat support bracket 30. In a station wagon there is one of these brackets at each end of the seat as is well understood in the art, and similarly the linkage means described below is duplicated at the opposite side of the seat. For simplicity of disclosure, the support bracket and linkage means at only one side of the seat are shown in this form of the invention, and it will be understood that similar structure is utilized at the opposite side of the seat.

A support link 32 is pivotally connected at 34 at its forward end to a front extension of the support bracket 30 and at its rear end the support link is pivoted at 36 on a memebr which forms part of the seat cushion 14 as will be described below. The support link has an integral abutment portion 38 for supporting the seat cushion adjacent its front side when the seat cushion is in its passenger carrying position as illustrated in Figs. 1 and 2. Another integral abutment portion 40 on the opposite side of the support link supports the seat cushion when it is in its cargo carrying position as illustrated in Fig. 3.

Along the lower side of the seat 14 there is rigidly secured one arm of an L-shaped interconnecting link 42, and as shown in Fig. 2, the pivotal connection 36 is made between the support link 32 and this interconnecting link 42. The other end of the L-shaped interconnecting link extends up along and above the rear side of the seat cushion 14 and is pivotally connected at 44 to a second interconnecting link 46. This second link is rigidly connected to the frame of the seat back 16 and is pivotally connected at its lower end at 48 to an upwardly projecting portion of the fixed mounting bracket 30. According to this arrangement, the support link 32 pivotally connects the seat cushion to the vehicle body through the mounting bracket 30 and there are two interconnecting links between the seat cushion 14 and the seat back 16. The first interconnecting link 42 is rigidly connected to the seat cushion and pivotally connected to the seat back and the second interconnecting link 46 is rigidly connected to the seat back and pivotally connected to the vehicle body rearwardly of the pivotal connection 36 between the support link and the seat cushion.

Figs. 1 and 2 show the seat in its normal or passenger carrying position. The seat back may be swung forwardly and downwardly to a prone position as illustrated in Fig. 3 wherein its back side forms a support floor, and during this swinging movement, the support link 32 and the interconnecting links 42 and 46 carry the seat cushion forwardly and downwardly to a position beneath the prone seat back. In this prone position, the abutment portion 40 of the support link 32 engages the underside of the rigidly mounted arm of the link 42 to prevent further swinging movement of the parts.

A board or sheet member 50 is hingedly mounted on the seat back adjacent the bottom edge thereof at 52. After the seat back has been swung to its prone position, the board 50 may be swung through an arc of 180 degrees into the plane of the support floor so that the cargo carrying support floor has been extended beyond the forward edge of the mat 22 throughout the longitudinal extent of the sheet member 50 and the rear surface of the seat back.

In order to counterbalance the weight of the seat, a torsion spring 60 is connected between the seat cushion and the linkage means. This spring is coiled about an extension 62 which is secured to the rigid seat cushion link 42. One end of the spring is anchored in a notch 62a in the end of the member 62 and the other end of spring is anchored in an opening in the link 32.

When the parts are in the passenger carrying position of Fig. 1, the pivotal connection 36 between the support link 32 and the seat cushion 14 is below a straight line designated at X and extending between the pivotal connection 34 between the support link 32 and the vehicle body and the pivotal connection 44 between the first interconnecting link 42 and the seat back 16. By virtue of this linkage arrangement, it may be seen that a straight, forward force exerted against the seat back will not cause the seat back to swing to its prone position but will lock it more tightly in its upright passenger carrying position. In the event cargo which is being carried in the rear floor portion 20 of the vehicle shifts forwardly as might happen in case of a sudden stop, the straight, forward force against the seat back will tend to swing the pivotal connecting point 36 downwardly since the linkage arrangement is such that this pivotal connecting point is below the straight line X. Abutment of the support link portion 38 with the undersurface of the link 42 blocks downward movement of the pivotal connecting point 36.

In order to convert the second seat from the passenger arrangement of Fig. 1 to the cargo carrying arrangement of Fig. 3, it is merely necessary to lift up slightly during initial swinging movement of the seat back to raise the pivotal connection 36 up to the level of the line X so that the toggle formed by links 32 and 42 will pass over center and permit the seat back to swing forwardly and downwardly to its prone position.

Figs. 4, 5 and 6 show a modified form of the invention in which the toggle lock described above in connection with the linkage arrangement is eliminated so that a straight, forward push on the seat back may be utilized to move the parts from the passenger carrying position of Figs. 4 and 5 to the cargo carrying position of Fig. 6. While not shown, the counterbalance spring shown in Figs. 1, 2 and 3 may be utilized if desired.

In Figs. 4, 5 and 6, the vehicle body 112 carries a second seat including a cushion 114 and a seat back 116 located behind the front seat back 118. The floor portion 120 of the vehicle body rearwardly of the second seat is provided with the usual floor mat 122 and the floor portion sweeps downwardly and forwardly at 124 to provide mounting space for the second seat. Ahead of the second seat there is a downwardly and forwardly swept portion 126 to provide foot space for the passengers.

A mounting bracket 130 is bolted to the vehicle body floor portion 124 and a support link 132 pivotally connects the seat cushion to the vehicle body, being pivoted at its lower forward end at 134 on the mounting bracket 130 and being pivoted at its other end at 136 on the seat cushion. Abutment portions 138 and 140 on the support link are used to support the seat cushion in the same manner as is described in connection with the first embodiment of the invention.

A first interconnecting link 142 is rigidly connected to the seat cushion along the end thereof and is pivotally connected at 144 to the seat back and a second interconnecting link 146 is rigidly connected to the seat back and is pivotally connected to the vehicle body, being pivoted at 148 on the mounting bracket 130. A sheet member 150 is hingedly connected at 152 to the lower edge of the seat back 116.

In this embodiment of the invention, a straight line Y may be drawn from the pivotal connection 134 between the support link 132 and the fixed mounting bracket 130 to the pivotal connection 144 between the first interconnecting link 142 and the seat back 116, and it will be noted that the pivotal connection 136 between the support link 132 and the seat cushion 114 is above the line Y. Consequently, there is no toggle lock as there was in the embodiment of Figs. 1, 2 and 3, and a straight, forward force exerted against the seat back will shift the parts from the passenger carrying position of Figs. 4 and 5 to the cargo carrying position of Fig. 6.

Figs. 7, 8, 9 and 10 show how the invention may be applied to a split second seat of the type found in nine passenger station wagons wherein there are three seats. In vehicles of this type, the second or middle seat is split into two portions. On the left side of the vehicle, there is a two passenger seat portion, and on the right side of the vehicle, there is a single passenger seat portion which may be tilted forwardly to provide ease of access to the third or rear seat.

Referring to Fig. 10, the two passenger seat on the left side of the vehicle comprises a seat cushion 214 and a seat back 216 with support and interconnecting link means similar to those described in connection with Figs. 4–6. On the left side of the two passenger seat, there is a mounting bracket 230 bolted to the vehicle floor and one end of a support link 232 is pivotally mounted at 234 on an upstanding portion of the bracket 230. At its other end, the support link is pivotally connected at 236 to the seat cushion 214. A first interconnecting link 242 is rigidly connected to the seat cushion and pivotally connected to the seat back at 244 and a second interconnecting link 246 is rigidly connected to the seat back and pivotally connected to the bracket 230 at 248. At the right side of the two passenger seat there are similar support and interconnecting link means which are designated by reference characters similar to the structure last described with the addition of a prime ('). A support bracket 300 is common to the two passenger seat support means and to the single passenger seat support means. The two passenger seat may be converted between passenger carrying and cargo carrying positions in the manner described earlier in connection with the embodiment of the invention shown in Figs. 4, 5 and 6. If desired the linkage may be arranged to provide the toggle lock of Figs. 1, 2 and 3.

At the right side of the vehicle body, there is a single passenger seat comprising a seat cushion 314 and a seat back 316, the seat being mounted on support and interconnecting link means to provide for its conversion from a passenger carrying position to a cargo carrying position. Since the seat is only a single passenger unit, it may easily be tilted to provide ready access to the third or rear seat (not shown). On the right or outer side of the body there is a mounting bracket 330 bolted to the vehicle floor. A support link 332 is pivotally connected at 334 to the mounting bracket 330 and is pivotally connected at 336 to the seat cushion 314. A support bracket has integral abutment portions 338 and 340 for abutting and supporting the seat cushion in each of its two positions. A first interconnecting link 342 is rigidly connected to the seat cushion and pivotally connected to the seat back 316 at 344 and a second interconnecting link 346 is rigidly connected to the seat back and pivotally connected to the mounting bracket 330 at 348. As shown in Fig. 10, there are similar supporting and interconnecting links at the opposite or left side of the single seat and these support and interconnecting links are designated by the same reference characters with the addition of a prime. While the support and interconnecting link arrangement may be in accordance with the embodiment of the invention shown in Figs. 1, 2 and 3, or in accordance with the embodiment of the invention shown in Figs. 4, 5 and 6, the latter form is preferred for this single seat in order to facilitate tilting of the seat back to provide access to the rear seat.

While not shown, the counterbalance spring shown in Figs. 1, 2 and 3 may be utilized in either or both the two passenger seat and the single passenger seat.

While we have shown and described several embodiments of our invention, it is capable of many modifications. Changes, therefore, in the construction and arrangement may be made without departing from the spirit and scope of the invention as set forth in the appended claims.

What is claimed is:

1. In a vehicle body of the type having a seat bottom and a seat back, the improvement comprising linkages on each side of the seat providing the seat bottom and back with support and co-ordinated movement from a rearward and upright position where a passenger carrying seat is presented to a forward and folded position where a cargo carrying floor is presented by the rear face of the seat back, each of said linkages comprising front and rear links having their lower ends pivotally connected to the vehicle body and an interconnecting link having front and rear portions pivotally connected to the upper ends of the front and rear links, the seat cushion being rigidly secured to the interconnecting link and the seat back being rigidly secured to the rear link and the interconnecting link being generally L-shaped and aligned with the side of the seat bottom and back when a passenger carrying seat is presented to avoid interference to passengers.

2. Apparatus according to claim 1 including a sheet member hingedly mounted on the lower edge of the seat back for movement from an upright position when the seat back is in upright position to a rearward and downward position when the seat back is in forward folded position to serve as a supplemental cargo carrying floor.

3. Apparatus in accordance with claim 1 including abutments on the front and rear sides of the front link adapted to engage the interconnecting link, the front abutment being engaged when a passenger carrying seat is presented and the rear abutment being engaged when a cargo carrying floor is presented.

4. Apparatus as in claim 3 including a counterbalance spring having one end connected to the front link and the other end connected to the interconnecting link.

5. Apparatus according to claim 4 wherein the pivotal connection between the front link and the interconnecting link, when a passenger carrying seat is presented, is slightly below a straight line drawn between the pivotal connection of the front link with the vehicle body and the pivotal connection of the rear link with the interconnecting link.

References Cited in the file of this patent

FOREIGN PATENTS

| 1,134,540 | France | Dec. 3, 1956 |
| 851,673 | Germany | Oct. 6, 1952 |
| 928,506 | Germany | June 2, 1955 |
| 237,670 | Great Britain | Aug. 6, 1925 |
| 515,788 | Great Britain | Dec. 14, 1939 |
| 249,708 | Italy | Aug. 7, 1926 |